United States Patent
Shelley et al.

(10) Patent No.: US 7,441,469 B2
(45) Date of Patent: Oct. 28, 2008

(54) METHOD AND APPARATUS FOR MEASURING FLOW THROUGH A CONDUIT BY MEASURING THE CORIOLIS COUPLING BETWEEN TWO VIBRATION MODES

(75) Inventors: Stuart J. Shelley, Cincinnati, OH (US); Thomas Dean Sharp, Cincinnati, OH (US)

(73) Assignee: Micro Motion, Inc., Boulder, CO (US)

( * ) Notice: Subject to any disclaimer, the term of this patent is extended or adjusted under 35 U.S.C. 154(b) by 7 days.

(21) Appl. No.: 11/574,704

(22) PCT Filed: Sep. 9, 2004

(86) PCT No.: PCT/US2004/029419

§ 371 (c)(1),
(2), (4) Date: Mar. 5, 2007

(87) PCT Pub. No.: WO2006/031215

PCT Pub. Date: Mar. 23, 2006

(65) Prior Publication Data

US 2008/0092667 A1    Apr. 24, 2008

(51) Int. Cl.
*G01F 1/84* (2006.01)
(52) U.S. Cl. .................... 73/861.355; 73/861.357; 702/45
(58) Field of Classification Search ................ 73/861.355–861.357
See application file for complete search history.

(56) References Cited

U.S. PATENT DOCUMENTS

| | | | |
|---|---|---|---|
| RE31,450 E | | 11/1983 | Smith |
| 4,491,025 A | | 1/1985 | Smith et al. |
| 4,876,898 A | * | 10/1989 | Cage et al. ............. 73/861.355 |
| 5,576,500 A | * | 11/1996 | Cage et al. ............. 73/861.357 |
| 5,987,999 A | * | 11/1999 | VanCleve et al. ...... 73/861.357 |
| 6,092,429 A | | 7/2000 | Cunningham et al. |
| 6,199,022 B1 | | 3/2001 | Cunningham |
| 6,233,526 B1 | | 5/2001 | Cunningham |
| 6,272,438 B1 | | 8/2001 | Cunningham et al. |
| 6,347,293 B1 | | 2/2002 | Cunningham et al. |
| 6,360,175 B1 | | 3/2002 | Cunningham et al. |
| 6,427,127 B1 | | 7/2002 | Cunningham |
| 6,520,028 B1 | * | 2/2003 | Van Cleve et al. ...... 73/861.354 |
| 6,577,977 B2 | | 6/2003 | Normen |
| 6,606,573 B2 | | 8/2003 | Wheeler |
| 2007/0272034 A1 | * | 11/2007 | Tombs .................... 73/861.357 |

FOREIGN PATENT DOCUMENTS

| | | |
|---|---|---|
| JP | 07139986 | 6/1995 |
| WO | WO95/16897 | 6/1995 |

* cited by examiner

*Primary Examiner*—Harshad Patel
(74) *Attorney, Agent, or Firm*—The Ollila Law Group LLC

(57) ABSTRACT

A method and apparatus is disclosed that measures the flow through a conduit (702) by measuring the Coriolis coupling between two vibration modes in the conduit. The conduit is first excited at two different vibration modes at two different frequencies (704). The coupling between the two modes is determined by forcing the phases of the two modes at the off mode frequency to be zero (708). The flow through the conduit can then be determined using the magnitude of the forces required to drive the phases of the two modes at the off mode frequency to zero (710).

32 Claims, 7 Drawing Sheets

METHOD AND APPARATUS FOR MEASURING FLOW THROUGH A CONDUIT BY MEASURING THE CORIOLIS COUPLING BETWEEN TWO VIBRATION MODES

BACKGROUND OF THE INVENTION

1. Field of the Invention

The invention is related to the field of flow meters, and in particular, to Coriolis flow meters.

2. Description of the Prior Art

Flow rate is measured in a Coriolis flow meter by vibrating a fluid-carrying tube(s) in a sinusoidal motion and measuring the time delay (or phase angle) between the vibration response at two or more locations on the tube(s). For practical situations the time delay varies linearly with flow rate, however, the time delay is generally not zero at zero flow. There is usually a zero-flow delay or offset caused by a number of factors such as non-proportional damping, residual flexibility response, electromagnetic crosstalk, or phase delay in instrument electronics.

This zero-flow offset is typically corrected for by measuring the zero-flow offset at the zero-flow condition and subtracting the measured offset from subsequent measurements made during flow. This would be sufficient to correct for the zero-flow offset problem if the zero-flow offset remained constant. Unfortunately, the zero-flow offset can be affected by small changes in the ambient environment (such as temperature) or to changes in the piping system through which the material is flowing. The changes in the zero-flow offset will cause errors in the measured flow rates. During normal operations, there may be long periods of time between no-flow conditions. The Coriolis flow meter can be calibrated by zeroing the meter only during these no-flow conditions. The changes in the zero-offset over time may cause significant errors in the measured flow.

Therefore there is a need for a system and method for measuring the flow independent of zero offset problems.

SUMMARY OF THE INVENTION

A method and apparatus is disclosed that measures the flow through a conduit by measuring the Coriolis coupling between two vibration modes in the conduit. The conduit is first excited at two different vibration modes at two different frequencies. The coupling between the two modes is determined by forcing the phases of the two modes at the off mode frequency to be zero. The flow through the conduit can then be determined using the magnitude of the forces required to drive the phases of the two modes to zero.

ASPECTS

One aspect of the invention includes, a method, comprising:

flowing a material through a conduit;

exciting the vibration of the conduit at the natural frequency of at least two vibration modes;

measuring the motion of the conduit;

controlling the vibration of the conduit such that the coupling between the two vibration modes is reduced to approximately zero;

determining the flow of material through the conduit using a measure of the controlling function.

Preferably, the method further comprises where one of the vibration modes is the main bending mode of the conduit.

Preferably, the method further comprises where one of the vibration modes is the main twisting mode of the conduit.

Preferably, the method further comprises where the controlling function is a feedback loop.

Preferably, the method further comprises where the feedback loop activates a real normal mode drive system.

Preferably, the method further comprises where an input to the feedback loop is an estimate of the modal coordinate of one of the at least two vibration modes of the conduit derived using a modal filter.

Another aspect of the invention comprises:

flowing a material through a conduit while exciting a first vibration mode of the conduit at a first frequency;

exciting a second vibration mode of the conduit at a second frequency;

measuring the relative motion of the vibrating conduit;

exerting a first force on the conduit such that the vibration of the second mode at the first frequency is reduced to a minimum;

exerting a second force on the conduit such that the vibration of the first mode at the second frequency is reduced to a minimum;

determining the flow of material through the conduit based on the magnitude of the first and second forces.

Preferably, the method further comprises where the first vibration mode is the main bending mode of the conduit.

Preferably, the method further comprises where the first frequency is the natural frequency of the main bending mode of the conduit.

Preferably, the method further comprises where the second vibration mode is the main twisting mode of the conduit.

Preferably, the method further comprises where the second frequency is the natural frequency of the main twisting mode of the conduit.

Preferably, the method further comprises where the first and second forces are exerted simultaneously.

Preferably, the method further comprises where the first and second forces are applied by a feedback loop.

Preferably, the method further comprises where the feedback loop activates a real normal mode drive system.

Preferably, the method further comprises where an input to the feedback loop is an estimate of the modal coordinate of the first vibration mode of the conduit derived using a modal filter.

Another aspect of the invention comprises:

flowing a material through a conduit while exciting a first vibration mode of the conduit at a first frequency;

exciting a second vibration mode of the conduit at a second frequency;

measuring the relative motion of the vibrating conduit at a first point and at a second point;

determining a first dt between the first point and the second point measured at the first frequency;

determining a second dt between the first point and the second point measured at the second frequency;

exerting a first force on the conduit such that the first dt is reduced to approximately zero;

exerting a second force on the conduit such that the second dt is reduced to approximately zero;

determining the flow of material through the conduit based on the magnitude of the first and second force.

Preferably, the method further comprises where first point and the second point are in a spaced apart configuration and are spaced symmetrically around an axial center of the conduit.

Another aspect of the invention comprises:

flowing a material through a conduit;

exciting the vibration of the conduit at the natural frequency of a vibration mode of the conduit;

measuring the motion of the conduit;

forcing the induced vibration of the conduit, caused by the flowing material, to approximately zero at the natural frequency of the excited vibration mode of the conduit;

determining the flow of material through the conduit using a measure of the force.

Preferably, the method further comprises where the excited vibration mode of the conduit is the main bending mode and the induced vibration mode is the main twisting mode of the conduit.

Preferably, the method further comprises where the excited vibration mode of the conduit is the main twisting mode and the induced vibration mode is the main bending mode of the conduit.

Preferably, the method further comprises where the determined flow of material through the conduit is corrected using a zero offset amount.

Another aspect of the invention comprises:

a conduit configured to contain a material flowing through the conduit;

at least two drivers configured to excite a plurality of vibration modes of the conduit;

a sensing apparatus configured to measure the relative motion of the vibrating conduit;

a control system configured to excite at least two vibration modes of the conduit using the at least two drivers;

the control system configured to determine a coupling between the at least two vibration modes of the conduit;

the control system configured to apply a force to the conduit that will reduce the coupling between the at least two vibration modes to approximately zero the control system configured to determine the flow of material through the conduit using a measure of the force.

Preferably, the method further comprises where one of the vibration modes is the main bending mode of the conduit.

Preferably, the method further comprises where one of the vibration modes is the main twisting mode of the conduit.

Preferably, the method further comprises a feedback loop.

Preferably, the method further comprises:

a real normal mode drive system activated by the feedback loop.

Preferably, the method further comprises where an input to the feedback loop is an estimate of the modal coordinate of one of the at least two vibration modes of the conduit derived using a modal filter.

Another aspect of the invention comprises:

a conduit configured to contain a material flowing through the conduit;

at least two drivers configured to excite a plurality of vibration modes of the conduit;

a sensing apparatus configured to measure the relative motion of the vibrating conduit at a first point and at a second point;

a control system configured to excite a first vibration mode of the conduit at a first frequency;

the control system configured to excite a second vibration mode of the conduit at a second frequency;

the control system configured to determine a first dt between the first point and the second point measured at the first frequency;

the control system configured to determine a second dt between the first point and the second point measured at the second frequency;

the control system configured to exert a first force on the conduit such that the first dt is reduced to approximately zero;

the control system configured to exert a second force on the conduit such that the second dt is reduced to approximately zero;

the control system configured to determine the flow of material through the conduit based on the magnitude of the first and second force.

Preferably, the method further comprises where first point and the second point are in a spaced apart configuration and are spaced symmetrically around a center of the conduit.

Another aspect of the invention comprises:

a conduit configured to contain a material flowing through the conduit;

at least two drivers configured to excite a plurality of vibration modes of the conduit;

a sensing apparatus configured to measure the relative motion of the vibrating conduit at a first point and at a second point;

a control system configured to excite a first vibration mode of the conduit at the natural frequency of the vibration mode;

the control system configured to force the induced vibration of the conduit, caused by the flowing material, to approximately zero at the natural frequency of the excited vibration mode of the conduit;

the control system configured to determine the flow of material through the conduit using a measure of the force.

Preferably, the method further comprises where the excited vibration mode of the conduit is the main bending mode and the induced vibration mode is the main twisting mode of the conduit.

Preferably, the method further comprises where the excited vibration mode of the conduit is the main twisting mode and the induced vibration mode is the main bending mode of the conduit.

Preferably, the method further comprises where the determined flow of material through the conduit is corrected using a zero offset amount.

Another aspect of the invention comprises:

a conduit configure to contain a material flowing through the conduit;

a means for exciting at least two vibration modes of the conduit;

a means for sensing the relative motion of the vibrating conduit;

a means for determining a coupling between the at least two vibration modes of the conduit;

a means for applying a force to the conduit that will reduce the coupling between the at least two vibration modes to approximately zero a means for determining the flow of material through the conduit using a measure of the force.

DETAILED DESCRIPTION OF THE PREFERRED EMBODIMENT

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Theoretical Background for a Simple Two Mode Model

Assuming that the structure of the flow meter is linear and time invariant, it can be described by a set of second order linear differential Equations, (1). In this case x is a vector representing the motion of the structure at various locations on the structure, and $F_D$ represents a vector of forces applied to the meter structure. Mass flow through the meter can be treated as an external signal, F, that changes the dynamics of the system.

$$M\ddot{x}+D\dot{x}+Kx=F_D \quad (1)$$

Now to obtain some basic understanding of the operation of the Coriolis flow meters Equation (1) will be transformed into a real normal coordinate space, where each equation corresponds to a real normal vibration mode of the flow meter structure. Real normal modes are used here for several reasons. First, for typical structures, real normal modes accurately represent the actual modes of vibration seen in the structure. Second, they allow the Coriolis forces generated by flow to be meaningfully integrated into the differential equations. This transformation is performed using the matrix of real normal eigenvectors of the system, $\Phi$. This transformation is shown below.

$$x=\Phi\eta$$

$$M\Phi\ddot{\eta}+D\Phi\dot{\eta}+K\Phi\eta=F_D$$

$$\Phi^T M\Phi\ddot{\eta}+\Phi^T D\Phi\dot{\eta}+\Phi^T K\Phi\eta=$$

$$N_D=\Phi^T F_D \quad (2)$$

Now the two transformed matrices, $\Phi^T M\Phi$, and $\Phi^T K\Phi$ will be diagonal. $\Phi^T D\Phi$ will also be diagonal if there is no non-proportional damping or Coriolis forces present in the system. In this case, this transformation decouples the matrix differential Equation, (2), into a set of independent second order differential equations. This de-coupling means that the modes of the structure do not effect each other (e.g., motion in the bend mode does not excite the twist mode).

To further simplify the system only two of these de-coupled modes will be considered, the bend mode and the twist mode. This can be viewed as pulling two rows out of matrix Equation (2). Furthermore, we assume that we can apply forces directly to and measure these two vibration modes, FIG. 1 depicts this case.

Figure 1:
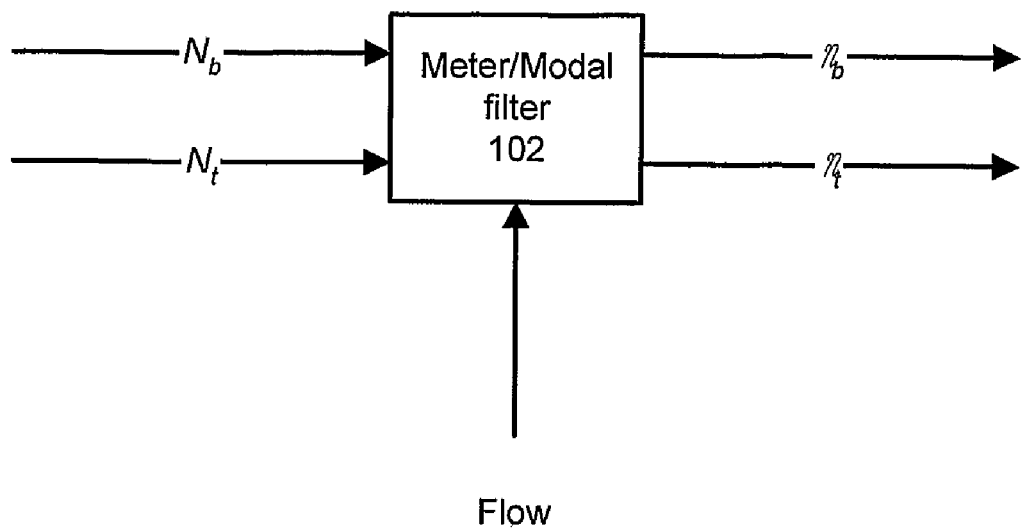
FIG. 1 is a block diagram of a simple 2 mode model of a Coriolis flow meter.

FIG. 1 shows the simple two mode model of the Coriolis flow meter. This model assumes that there are two inputs $N_b$ and $N_t$, representing the bend mode and the twist mode, respectively. There are also two outputs $n_b$, $n_t$, representing the measurements of the bend mode and twist mode respectively. In addition to the applied forces and measured vibrational modes, FIG. 1 also shows a third input corresponding to flow. It should be understood, that this model corresponds to the case of perfect force appropriation vectors and perfect modal filters.

Now for this analysis, assuming that only proportional damping is present, and we have no flow, the system can be described by the pair of Equations (3) (all terms in this equation are now scalars).

$$M_b\ddot{\eta}_b+D_b\dot{\eta}_b+K_b\eta_b=N_b$$

$$M_t\ddot{\eta}_t+D_t\dot{\eta}_t+K_t\eta_t=N_t \quad (3)$$

Figure 2A:
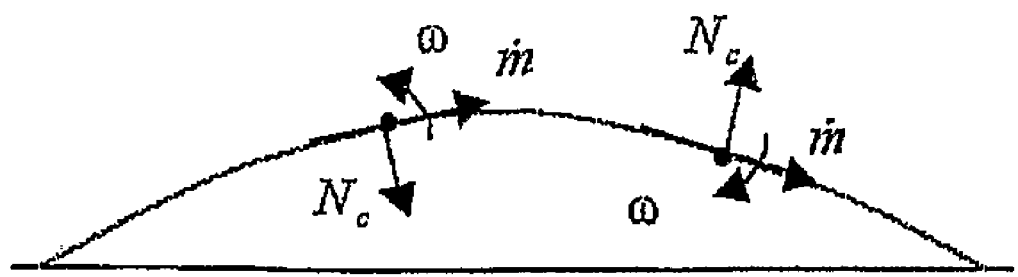
FIG. 2A is a diagram depicting the bend mode shape of a conduit in a Coriolis flow meter.
Figure 2B:
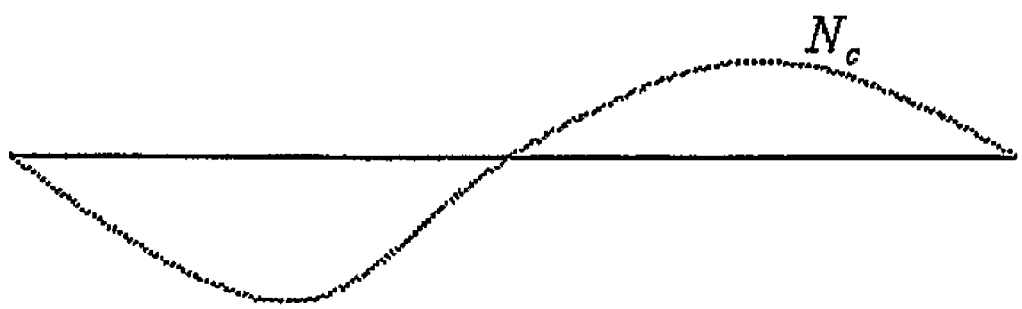
FIG. 2B is a diagram showing the magnitude of the distributed Coriolis force generated by the combination of bend mode and flow.

In this case the system can be described as two independent modes, totally uncoupled. If a force is applied to one mode there will be no response in the other mode. Now if we add flow, the motion of the modes will be coupled by the following mechanism. The motion of the mode(s) combine with the mass flow to cause a Coriolis force. This Coriolis force is distributed along the length of the meter, and has a shape related to the shape of the motion. The Coriolis force (in real normal space) is described by equation (4) and FIG. 2. FIG. 2A corresponds to the flow tube bend mode shape. Coriolis force caused by flow can be modeled based on the angular velocity, $\omega$, at a point and the mass flow, m, at a given point. FIG. 2B shows the magnitude of the distributed Coriolis force generated by the combination of bend mode and flow.

$$N_c=2\omega\times\dot{m}$$

$$\dot{m}=\rho A v_f \quad (4)$$

where $\dot{m}$ is the mass flow rate, $\omega$ is the angular rate of any point on the tube, $\rho$ is the density of the fluid in the tube, A is the cross sectional area of the tube, and $v_f$ is the flow rate of the fluid. $\dot{m}$ is assumed to be constant along the tube. $\omega$ is a function of the shape of the vibration. Typically, meters are driven in a manner to primarily excite the bend mode, resulting in a vibration shape corresponding to the bend mode shape. The shape of the Coriolis force pattern generated by this motion turns out to project strongly on the twist mode (see FIG. 2B). This projection couples the previously uncoupled modes. Now for the case where we are driving the bend mode, the relationship between $\eta_b$ and $\omega$ can be derived.

$$\vec{\eta}_b(x,t)=\phi_b(x)\eta_b(t)=\phi_b(x)\sin(2\pi f_b t) \quad (5)$$

Figure 3:
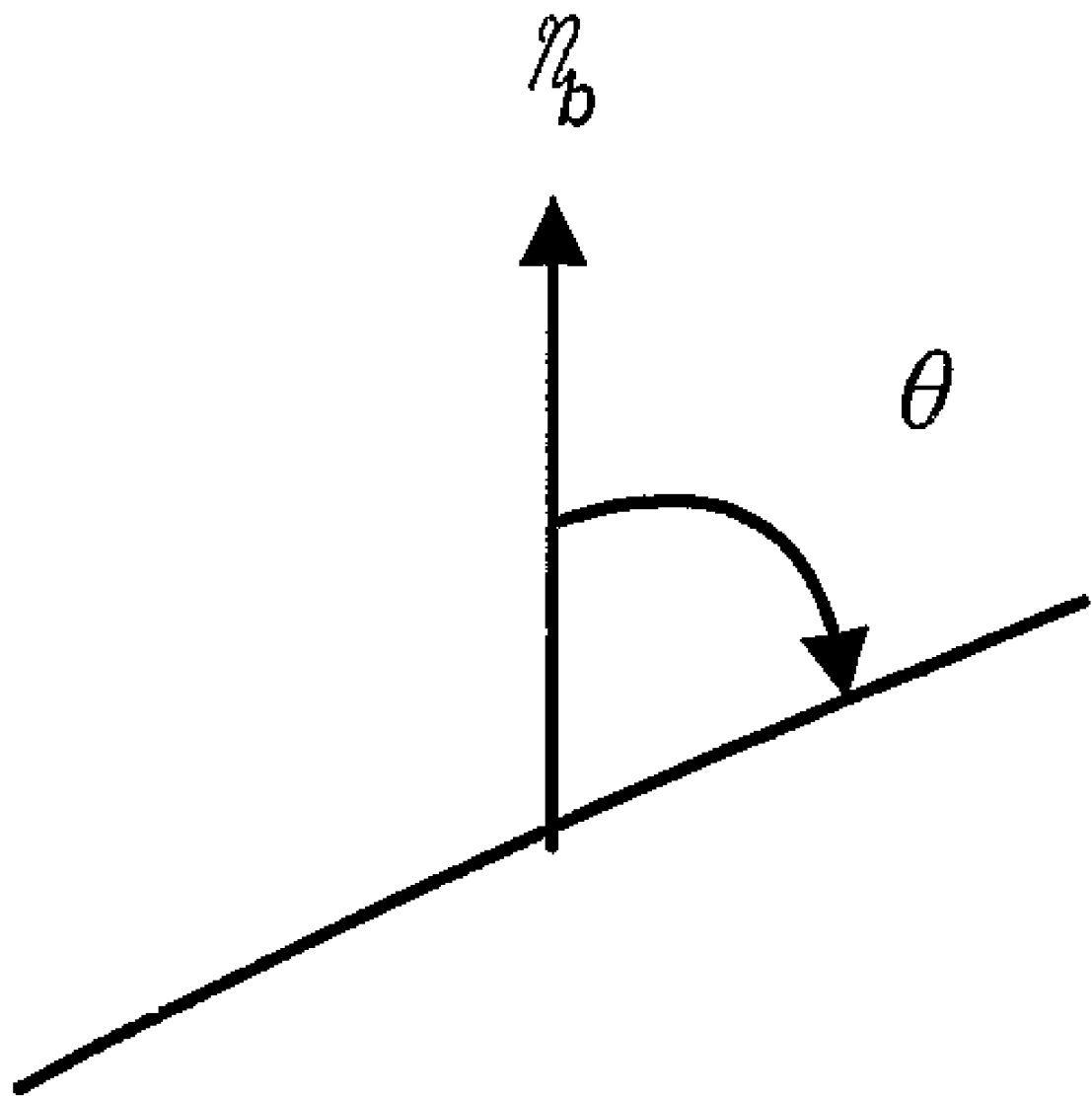
FIG. 3 is a diagram showing a section of the tube and the angle between the tube and the normal direction of the tube motion.

Assuming real normal modes, the motion of the tube at a given location along the tube x and time t can be described by Equation (5). represents the shape of the bend mode as a function of the displacement along the tube, i.e., the mode shape. The angular rotation at any point on the tube can be estimated from the slope of the tube at that point. Assuming that the angles are small, Equation (6), relates the slope to the angle (see FIG. 3). FIG. 3 depicts a section of a flow tube along with the angle, $\theta$, and the normal direction of the tube motion, $\eta_b$.

$$\theta \cong \frac{\partial \vec{\eta}_b(x, t)}{\partial x} \qquad (6)$$

The angular rate ω can be related to the bend mode motion by Equation (7).

$$\omega = \dot{\theta} = \frac{\partial \partial \vec{\eta}_b(x, t)}{\partial t \partial x} \qquad (7)$$

$$\omega = \frac{d\phi_b(x)}{dx} \frac{d\eta_b(t)}{dt} = \frac{d\phi_b(x)}{dx} \dot{\eta}_b(t)$$

Now combining (4) and (7), the Coriolis force can be described by Equation (8).

$$N_c = 2\rho A \left[ \frac{d\phi_b(x)}{dx} \times v_f \right] \dot{\eta}_b(t) \qquad (8)$$

This equation can be broken into two terms, one a function of the shape of the vibration, the other a function of the frequency of the motion.

$$\left[ \frac{d\phi_b(x)}{dx} \times v_f \right]$$

is the shape of the Coriolis force pattern. In this case, where we are driving the bend mode, this pattern will be such that it projects strongly on the twist mode. Now we are ready to examine how the modes couple. We can define a coupling term, Equation (9), $$C\dot{\eta}_b(t) = \phi_t(x) \cdot N_c \qquad (9)$$

$$C = \phi_t(x) \cdot 2\rho A \left[ \frac{d\phi_b(x)}{dx} \times v_f \right]$$

C is a function of how well the Coriolis force pattern projects onto the twist mode shape. This term, C, represents the amount of Coriolis coupling between the bend mode and the twist mode. Due to symmetry in the problem, the coupling from the twist mode to the bend mode has the same magnitude, but opposite sign. Furthermore, it is the modal velocity that is basis of the coupling. These facts are used in (10) to represent the dynamics of the system when coupling due to Coriolis forces are present.

$$M_b \ddot{\eta}_b + D_b \dot{\eta}_b + C \dot{\eta}_t + K_b \eta_b = N_b$$

$$M_t \ddot{\eta}_t + D_t \dot{\eta}_t - C \dot{\eta}_b + K_t \eta_t = N_t \qquad (10)$$

For clarity, we can rearrange this equation so the Coriolis force appears on the right hand side of the equation.

$$M_b \ddot{\eta}_b + D_b \dot{\eta}_b + K_b \eta_b = N_b - C \dot{\eta}_t = N_b - N_{ct}$$

$$M_t \ddot{\eta}_t + D_t \dot{\eta}_t + K_t \eta_t = N_t + C \dot{\eta}_b = N_t + N_{cb} \qquad (11)$$

The Coriolis force due to twist mode velocity, $N_{ct} = C\dot{\eta}_t$, applies a force to the bend mode. The Coriolis force due to bend mode velocity, $N_{cb} = C\dot{\eta}_b$, applies a force to the twist mode. So, with flow, the two modes are now coupled (e.g., the twist mode can be excited, even if only the bend mode is externally driven). Next we need to understand the displacement caused by the Coriolis forces (and therefore the velocities that are measured). For simplicity let's assume that we drive only the bend mode ($N_b \neq 0, N_t = 0$), and furthermore, assume that the Coriolis force on the bend mode due to twist velocity is small ($N_{ct} \cong 0$). This should be the case, even though we are driving the twist mode with $F_{cb}$, it is being driven off resonance so the amount of motion of this mode will be small and therefore the Coriolis force associated with it will also be small. In this case (11) simplifies to (12).

$$M_b \ddot{\eta}_b + D_b \dot{\eta}_b + K_b \eta_b = N_b$$

$$M_t \ddot{\eta}_t + D_t \dot{\eta}_t + K_t \eta_t = N_{cb} \qquad (12)$$

The Coriolis force, $N_{cb}$, is at the frequency of the bend mode. Since the bend mode frequency is much lower than the twist mode, it is driving the twist mode well below its resonance. This fact can be used to simplify the response of the twist mode. Consider a simplified undamped first order system, (13).

$$\frac{\eta}{F} = \frac{1}{Ms^2 + K} \qquad (13)$$

Evaluating along the jω axis, $$\frac{\eta}{F} = \frac{1}{-M\omega^2 + K} \qquad (14)$$

Now let's examine some points on the jω axis. For $$\omega = \sqrt{\frac{K}{M}},$$

at resonance, the contribution of the displacement due to the mass and stiffness are equal. As ω increases the transfer function becomes dominated by the mass term and can be approximated by $$\frac{1}{-M\omega^2},$$

which corresponds to 180 degree phase shift and amplitude that rolls off with $\omega^2$. Now for $$\omega \ll \sqrt{\frac{K}{M}},$$

the stiffness term dominates and the transfer function becomes $\frac{1}{K}$, which corresponds to an output that is in phase with the input and scaled by one over the stiffness. Using this we can simplify the second line of Equation (12) to Equation (15). The response due to the proportional damping is also neglected.

$$M_b \ddot{\eta}_b + D_b \dot{\eta}_b + K_b \eta_b = N_b \quad (15)$$

$$K_t \eta_t = N_{cb}$$

$$\eta_t = \frac{N_{cb}}{K_t} = \frac{C \dot{\eta}_b}{K_t}$$

Figure 4:
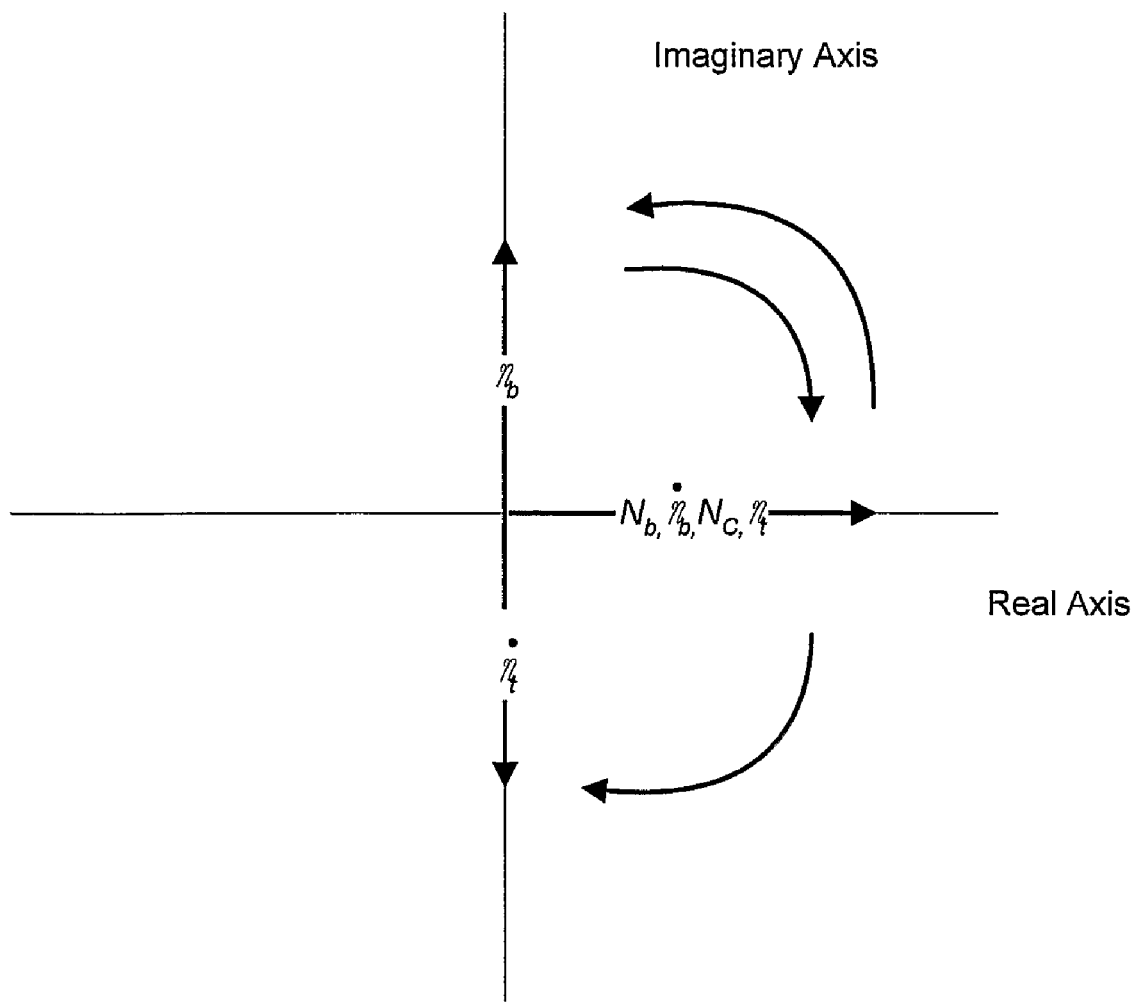
FIG. 4 is a diagram in a complex plane showing the phase relationship between the forces in a Coriolis flow meter.

At this stage, it is important to understand the phase relationship of these various forces and responses. FIG. 4 depicts the phase relationships. The figure is a complex plane with vectors depicting the various forces, displacements, and velocities associated with the simple two-mode model understanding of the Coriolis flow meter. This figure shows the phase relationship between the various vectors, however, it should be understood that the scaling of the vectors is not accurate. Assuming the conduit is being driven at resonance in the bend mode, bend mode position $\eta_b$ will be 90 degrees out of phase of the bend mode force $N_b$. Bend mode velocity $\dot{\eta}_b$ will be 90 degrees out of phase with bend mode position $\eta_b$. Coriolis force $N_C$ is in phase with bend velocity $\dot{\eta}_b$. Assuming the conduit is being driven in the twist mode well below the twist mode resonance then the twist response $\eta_t$ will be in phase with the Coriolis force. Twist mode velocity $\dot{\eta}_t$ will be 90 degrees out of phase with the twist mode position $\eta_t$.

For the next step, we need to determine the velocities at the pickoffs due to these two modes. Velocities are derived here since in an actual meter the velocity is typically measured. The response at a given pickoff is a linear combination of the two modes at the location of the pickoff (16). $\phi_{bpo}$ and $\phi_{tpo}$ are a function of the bend and twist mode shapes.

$$\dot{x}_{po} = \phi_{bpo} \dot{\eta}_b + \phi_{tpo} \dot{\eta}_t \quad (16)$$

Now the twist mode response, $\eta_t$ is 90 degrees out of phase with the bend mode, $\eta_b$ (see FIG. 5). Taking this into account, we can use a complex notation to depict the velocity at any pickoff, (17).

$$\dot{x}_{po} = \phi_{bpo} \dot{\eta}_b + i \phi_{tpo} \dot{\eta}_t \quad (17)$$

Now if we are interested in the phase of the pickoff signal, it can be approximated (assuming α is small) by (18).

$$\alpha = \tan^{-1}\left(\frac{\phi_{tpo} \dot{\eta}_t}{\phi_{bpo} \dot{\eta}_b}\right) \cong \frac{\phi_{tpo} \dot{\eta}_t}{\phi_{bpo} \dot{\eta}_b} \quad (18)$$

Now we need an estimate of $\dot{\eta}_t$. Since we are driving with a single sinusoid at the bend frequency, $\dot{\eta}_t$ can be described by Equation (19).

$$\dot{\eta}_t = \frac{\dot{N}_{cb}}{K_t} = \frac{C \ddot{\eta}_b}{K_t} = \frac{C \omega_b \dot{\eta}_b}{K_t} \quad (19)$$

Now if we combine (18) with (19) we can describe the phase at any point along the tube as (20).

$$\alpha = \frac{\phi_{tpo} C \omega_b}{\phi_{bpo} K_t} \quad (20)$$

It is interesting to note that the phase, α, is a function of the bend mode frequency; however, if we look at dt, this dependency is canceled, (21).

$$dt = \frac{\alpha}{\omega_b} = \frac{\phi_{tpo} C}{\phi_{bpo} K_t} \quad (21)$$

Now examining Equation (21), we can see that the dt is a function of the mode shapes ($\phi_t$ and $\phi_b$), the Coriolis coupling, C, and the residual flexibility of the twist mode, $K_t$. This equation will be used to determine the Coriolis coupling and therefore the material flow through the meter.

In Operation:

FIG. 5 shows a top view of a conduit 502 configured to contain a material flowing through the conduit. D1 and D2 are two drivers (also called actuators) spaced along the conduit 502. In the preferred mode the two drivers are spaced symmetrically around the axial center of the conduit. The drivers are configured to impart a force to the conduit 502 to excite a plurality of vibration modes in the conduit 502. The force may be substantially coherent (e.g. confined to a narrow frequency) or may be broadband. The drivers can be such known means as a magnet, attached to the conduit, and a coil, attached to a reference, through which an oscillating current is passed.

S1 and S2 depict two sensors co-located with drivers D1 and D2. In another embodiment the sensors may be located at a location other than at the driver location. The sensors are configured to produce a plurality of signals representing the location and motion of the conduit 502. The sensors may include a variety of devices, such as coil-type velocity transducers, optical or ultrasonic motion sensors, accelerometers, inertial rate sensors and the like. In this embodiment there are two sensors shown with each sensor co-located with one of the drivers. In other embodiments there may only be one sensor configured to measure the position and motion of the conduit 502 along the length of the conduit 502. Other configurations having more than 2 sensors are also possible.

Figure 5A:
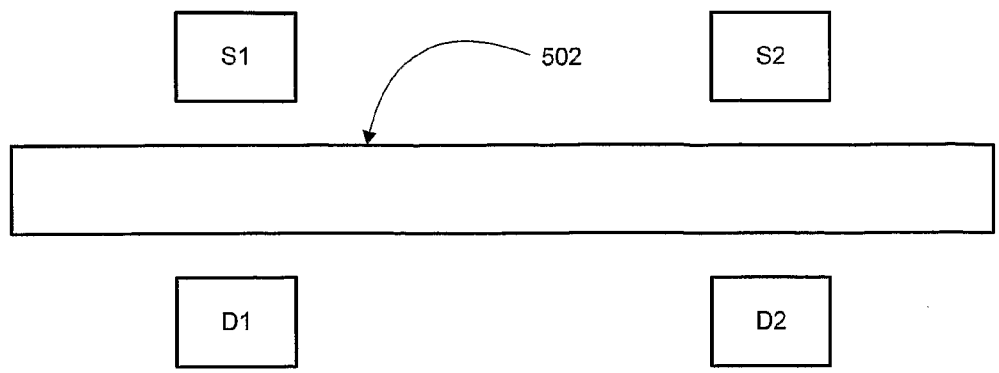
FIG. 5A is a top view of a conduit in an un-deflected position in an example embodiment of the invention.
Figure 5B:
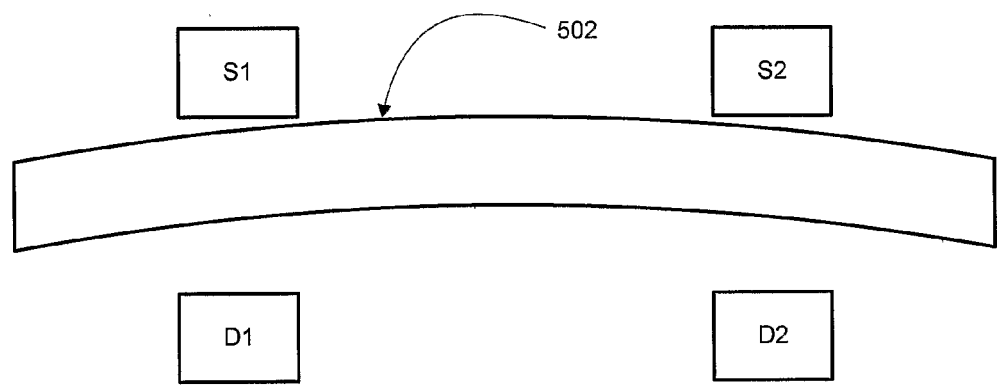
FIG. 5B is a top view of a conduit in a deflected position corresponding to the main bending mode in an example embodiment of the invention.

FIG. 5A shows the conduit 502 in an un-deflected state. By driving the actuators in phase with equal power, the main bending mode of the conduit can be excited. FIG. 5B shows the conduit 502 in a deflected state corresponding to the main bending mode of the conduit. By driving the actuators at the natural frequency of the bend mode $f_b$, the conduit can be put in resonance for the bend mode.

Figure 5C:
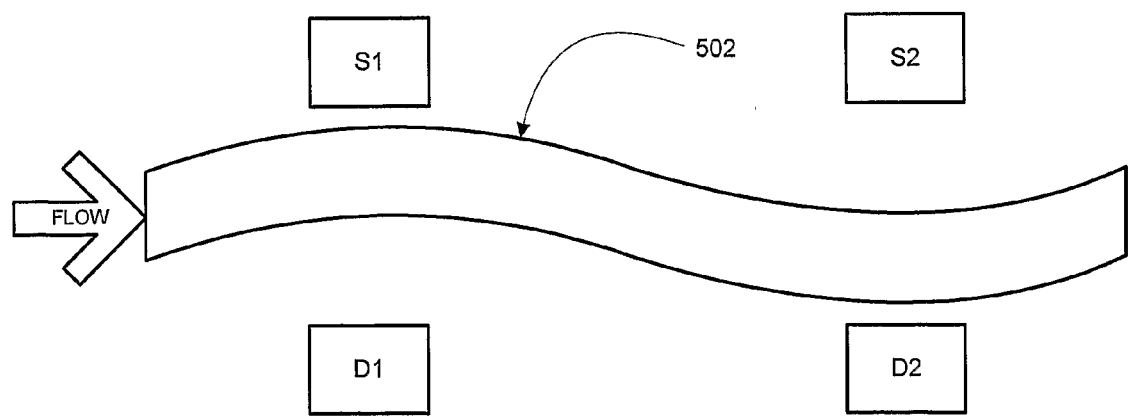
FIG. 5C is a top view of a conduit in a deflected position corresponding to the main twisting mode in an example embodiment of the invention.

The main twisting mode of the conduit can be excited by driving the actuators 180 degrees out of phase using equal power. FIG. 5C shows conduit 502 in a deflected state corresponding to the main twisting mode of the conduit. By adjusting the frequency of the driving force to match the natural frequency of the twist mode $f_t$, the conduit can be put in resonance at the twist mode. U.S. Pat. No. 6,092,429 granted Jul. 25, 2000 and entitled "Driver for oscillating a vibrating conduit", which is hereby included by reference, discloses drivers configured to excite different modes of vibration in a conduit. The deflection of the conduit 502 in FIGS. 5B and 5C have been magnified for clarity. The actual deflections of conduit 502 would be much smaller. The conduit may have additional vibration mode that could be excited.

The resonant frequency of the bend mode is typically much lower than the resonant frequency of the twist mode. When there is no flow through the system, assuming only proportional damping, the modes are totally uncoupled. When a force is applied to one mode of vibration, there is no response in the other vibration mode. For example, if the main twisting mode was excited, the conduit would twist but not bend (i.e. the center of the conduit would not be displaced). Once flow begins, the Coriolis forces couple the two vibration modes. By measuring the amount of coupling, the Coriolis forces can be determined, and thereby the material flow through the conduit can be determined.

In current Coriolis flow meters the coupling due to Coriolis forces is measured by exciting the vibration of the conduit in the bend mode and then measuring the amount of twist mode that is coupled into the conduit by the Coriolis forces. Unfortunately, in real Coriolis flow meters, the conduit may be vibrating in a number of other vibration modes in addition to the main bending and twisting modes. This may be caused by some non-proportional damping in the meter. External forces may also cause vibration of the conduit, for example pumps attached to the piping system that contain the Coriolis flow meter. The conduit motion may become complex with all the different vibration modes contributing to the velocity and displacement of the conduit. Measuring the amount of twist mode in the conduit may become difficult with the complex motion of the conduit. The contribution of the different vibration modes to the velocity of the conduit can be decomposed using a multi-channel modal filter to create n single degree of freedom model response signals. U.S. patent "Generalized modal space drive control system for a vibrating tube process parameter sensor" (U.S. Pat. No. 6,360,175) invented by Timothy J. Cunningham et. al. and issued on Mar. 19, 2002, teaches such a multi-channel modal filter, and is hereby incorporated by reference for all that it teaches. Using the modal filters, the velocity of the conduit due to the vibration of the twist mode at the bend mode frequency can be determined. Once the velocity of the conduit due to the twist mode has been determined, the relative phase between the velocity of the conduit at two points is compared. For example, the signals from S1 and S2 will be filtered and then the relative phase difference detected between sensor S1 and sensor S2 will be compared. The measured phase difference detected between S1 and S2 is a measure of the relative phase of the right eigenvector of the system and is proportional to the mass flow through the conduit. Let $\theta R$ equal the relative phase of the right eigenvector, $\theta S1$ be the measured phase of the vibration of the conduit at sensor S1, and $\theta S2$ be the measured phase of the vibration of the conduit at sensor S2, then $\theta R = \theta S1 - \theta S2$. A time difference, delta T, can be calculated from the phase difference by dividing by the vibration frequency $\omega$. $\Delta T = (\theta S1 - \theta S2)/\omega$. The time difference $\Delta T$ is also proportional to the mass flow through the conduit and is the measurement typically used in the mass flow meters. The vibration frequency $\omega$ is typically the natural frequency of the bend mode $f_b$.

A control loop is used to excite the vibration of the conduit in the bend mode at the bend mode natural frequency $f_b$. The control loop may use a modal response signal as feedback for the control loop. The modal response signal used corresponds to the vibration of the conduit at the bend mode. The control loop adjusts the force required to generate a given displacement or a maximum velocity of the conduit for the bend mode vibration. The control loop may be a modal space drive control system used to excite the vibration of the conduit at the bend mode natural frequency. U.S. patent "Generalized modal space drive control system for a vibrating tube process parameter sensor" (U.S. Pat. No. 6,360,175) invented by Timothy J. Cunningham et. al. and issued on Mar. 19, 2002, teaches such a modal space drive control system.

The control loop drive equation for a modal drive is shown is equation 22.

$$N_D = \begin{bmatrix} N_b \\ N_t \end{bmatrix} = \begin{bmatrix} \alpha & 0 \\ 0 & 0 \end{bmatrix} \begin{bmatrix} \dot{\eta}_b \\ \dot{\eta}_t \end{bmatrix} \quad (22)$$

Combining the control loop drive equation with the system equation (3) produces the equation for the resulting dynamic system (23).

$$M \begin{bmatrix} \ddot{\eta}_b \\ \ddot{\eta}_t \end{bmatrix} + \begin{bmatrix} b_{b1} + \alpha & 0 \\ 0 & b_{t2} \end{bmatrix} \begin{bmatrix} \dot{\eta}_b \\ \dot{\eta}_t \end{bmatrix} + K \begin{bmatrix} \eta_b \\ \eta_t \end{bmatrix} = 0 \quad (23)$$

In the normal control loop for current Coriolis flow meters, the automatic gain control (AGC) acts to adjust the amplitude of the vibration at the natural frequency of the bend mode by controlling the damping term $(b_{b1} + \alpha)$. If the damping term $(b_{b1} + \alpha)$ is less than zero energy is removed from the system and the amplitude of motion is reduced. When the damping term is greater than zero, energy is added to the system and the amplitude of the vibration at the natural frequency of the bend mode is increased. When the damping term is equal to zero the amplitude of the vibration does not change.

In one example embodiment of the invention, the control loop would use feedback for all the velocity terms, making the new feedback equation (24).

$$N_D = \begin{bmatrix} N_b \\ N_t \end{bmatrix} = \begin{bmatrix} \alpha_1 & \beta_1 \\ \beta_2 & \alpha_2 \end{bmatrix} \begin{bmatrix} \dot{\eta}_b \\ \dot{\eta}_t \end{bmatrix} \quad (24)$$

The damping terms in equation (24) will be composed of three different types of damping: proportional damping alpha, non-proportional damping b, and damping due to the Coriolis forces C. these components are related as shown in equation (25).

$$\begin{bmatrix} D_b \\ D_t \end{bmatrix} = \begin{bmatrix} \alpha_1 & b + C \\ b - C & \alpha_2 \end{bmatrix} \quad (25)$$

Using the feed back equation (24) and the damping matrix (25) the differential equation describing the behavior of the system can be rewritten as (26).

$$M\begin{bmatrix}\ddot{\eta}_b\\\ddot{\eta}_t\end{bmatrix}+\begin{bmatrix}b_{b1}+\alpha_b & b+C+\beta_b\\b-C+\beta_t & b_{t2}+\alpha_t\end{bmatrix}\begin{bmatrix}\dot{\eta}_b\\\dot{\eta}_t\end{bmatrix}+K\begin{bmatrix}\eta_b\\\eta_t\end{bmatrix}=0 \qquad (26)$$

There are 2 parameters in equation 26 that can be used to adjust the amplitude of vibration of the drive modes ($\alpha_b$, $\alpha_t$) and 2 parameters that can be adjusted to determine the damping due to the Coriolis forces ($\beta_b$ and $\beta_t$). The drive loop can control the amplitude of the vibration of the conduit at the bend mode natural frequency $f_b$ using the damping term ($b_{b1}+\alpha$). The drive loop can simultaneously control the vibration of the conduit in the twist mode natural frequency $f_t$ using the term ($b_{t2}+\alpha_t$). Once the conduit is resonating in both the bend and twist modes, dt measurements are made for both the bend mode and the twist mode. The dt measurement for the bend mode is the phase difference between S1 and S2 measured at the bend mode frequency. The dt for the twist mode is the phase difference between S1 and S2 measured at the twist mode frequency. Modal filtering may be used to help isolate the twist and bend mode responses when determining the dt's for the bend and twist modes.

Equation 21 relates the dt to the mode shape ($\Phi_t$ and $\Phi_b$), the Coriolis coupling C, and the residual flexibility of the twist mode $K_t$. Including the effects of the feedback parameter $\beta_b$, equation 21 can be rewritten as (27) for the dt of the bend mode.

$$dt_b = \frac{\phi_{tpo}(b+C+\beta_b)}{\phi_{bpo}K_t} \qquad (27)$$

Moving the residual flexibility term $K_t$ to the other side of the equation and adjusting $\beta_b$ until dt equals zero yields an equation that relates the force applied to the bend mode to the non-proportional damping and the Coriolis coupling C (28).

$$0=(b+C+\beta_b)$$

$$\beta_b=-(b+C) \qquad (28)$$

A dt bend of zero measured at the bend mode frequency corresponds to a vibration where there is no twist of the conduit at the bend mode frequency (i.e. the velocity measured by S1 and S2 are in phase at the bend mode frequency). $\beta_b$ is the force applied that is necessary to cause the cancellation of the vibration in the twist mode, at the bend mode frequency and is proportional to the non-proportional damping plus the Coriolis coupling.

Including the effects of the feedback parameters $\beta_t$, equation 21 can be rewritten as (29) for the dt of the twist mode.

$$dt_t = \frac{\phi_{tpo}(b-C+\beta_t)}{\phi_{bpo}K_bM_b\omega^2} \qquad (29)$$

Moving the residual flexibility term $K_bM_b\omega^2$ to the other side of the equation and adjusting $\beta_t$ until $dt_t$ equals zero yields an equation that relates the force applied to the twist mode to the non-proportional damping and the Coriolis coupling C (30).

$$\beta_t=-(b-C) \qquad (30)$$

A dt twist of zero measured at the twist mode frequency corresponds to a vibration where there is no bend of the conduit at the twist mode frequency (i.e. the velocity measured by S1 and S2 are 180 degrees out of phase at the twist mode frequency). $\beta_t$ is the force applied that is necessary to cause the cancellation of the vibration in the bend mode, at the twist mode frequency and is proportional to the non-proportional damping minus the Coriolis coupling.

Combining equation 28 and 30 yields equation 31.

$$\beta_b-\beta_t=b+C-(b-C)=2C \qquad (31)$$

As can be seen, the non-proportional damping terms cancel, leaving the damping due to the Coriolis forces in the system proportional to the measured forces $\beta_b$ minus $\beta_t$. Therefore the material flow can be determined, independent of the non-proportional damping, by measuring the two forces $\beta_b$ and $\beta_t$. Changes in residual flexibility will not effect the flow measured using this technique.

Figure 6:
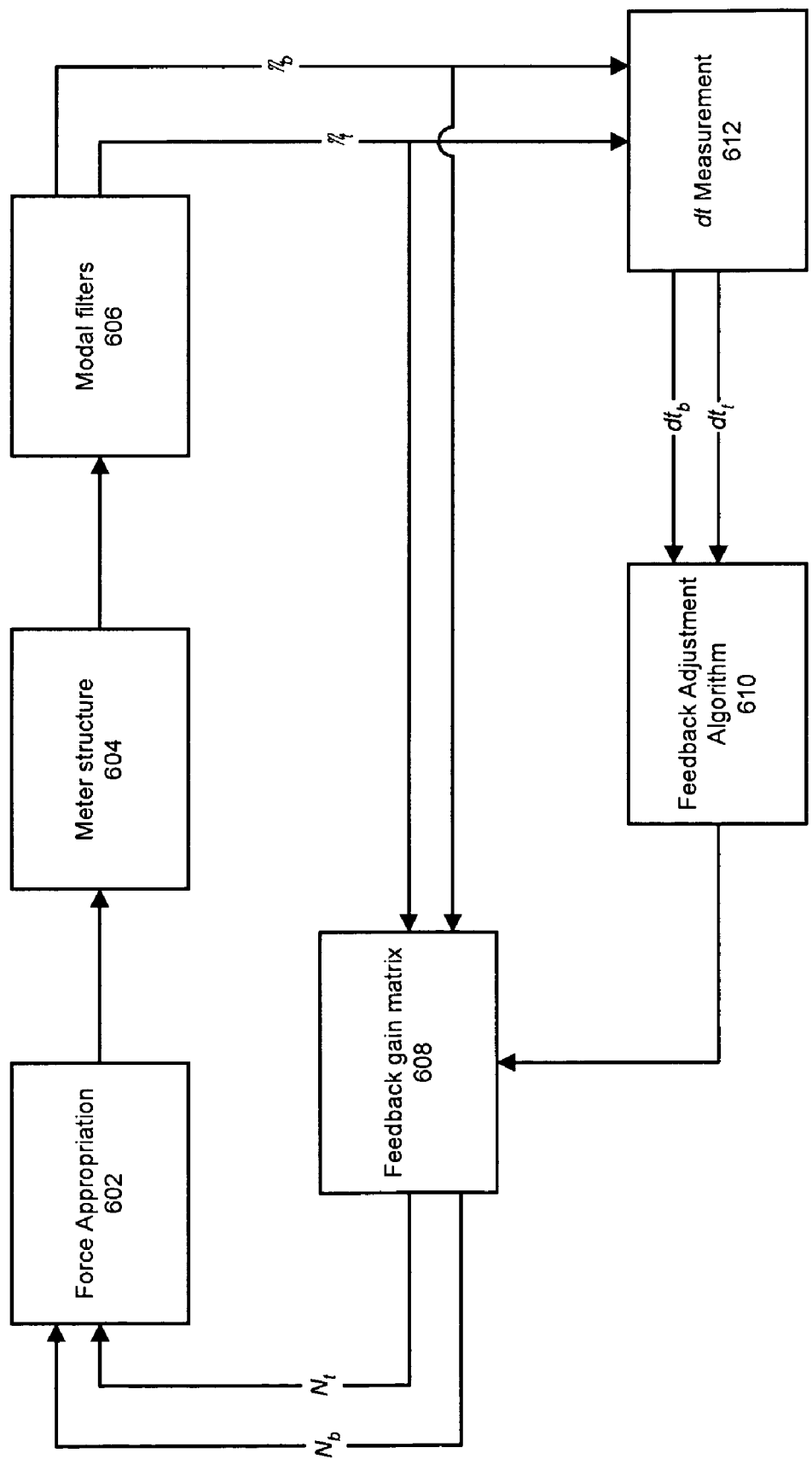
FIG. 6 is a block diagram of a control system used to implement one example embodiment of the invention.

By driving $dt_t$ and $dt_b$ to zero, the coupling between the two vibration modes has been reduced to zero. Zero coupling is defined as having no twisting at the bend mode frequency and no bending at the twist mode frequency. A control system may be used to adjust the coupling between the two vibration modes to zero. The control system may use modal filters to determine estimates of the real normal mode motion of the conduit. The control system may also use force appropriation vectors to drive the vibrations of the bend and twist modes. FIG. 6 is a block diagram of a control system in an example embodiment of the invention. In block 604 the motion of the conduit is measured. Modal filters are applied to the measured signals in block 606 creating estimates of modal coordinates for the bend $\eta_b$ and twist $\eta_t$ modes. The modal coordinate estimates are used to determine the $dt_t$ and $dt_b$ in block 612. The difference between the determined dt's and the desired dt's (i.e. zero) is used by a feedback adjustment algorithm in block 610 to adjust the feedback gain matrix of block 608. The modal coordinate estimates are also used by the feedback gain matrix in block 608 to generate the force appropriation vectors $N_b$ and $N_t$. The drivers in block 602 use the force appropriation vectors to drive the motion of the conduit. The feedback adjustment algorithm used in block 610 may be any adaptive algorithm designed to minimize an objective function, for example a multivariate Newton's algorithm.

Figure 7:
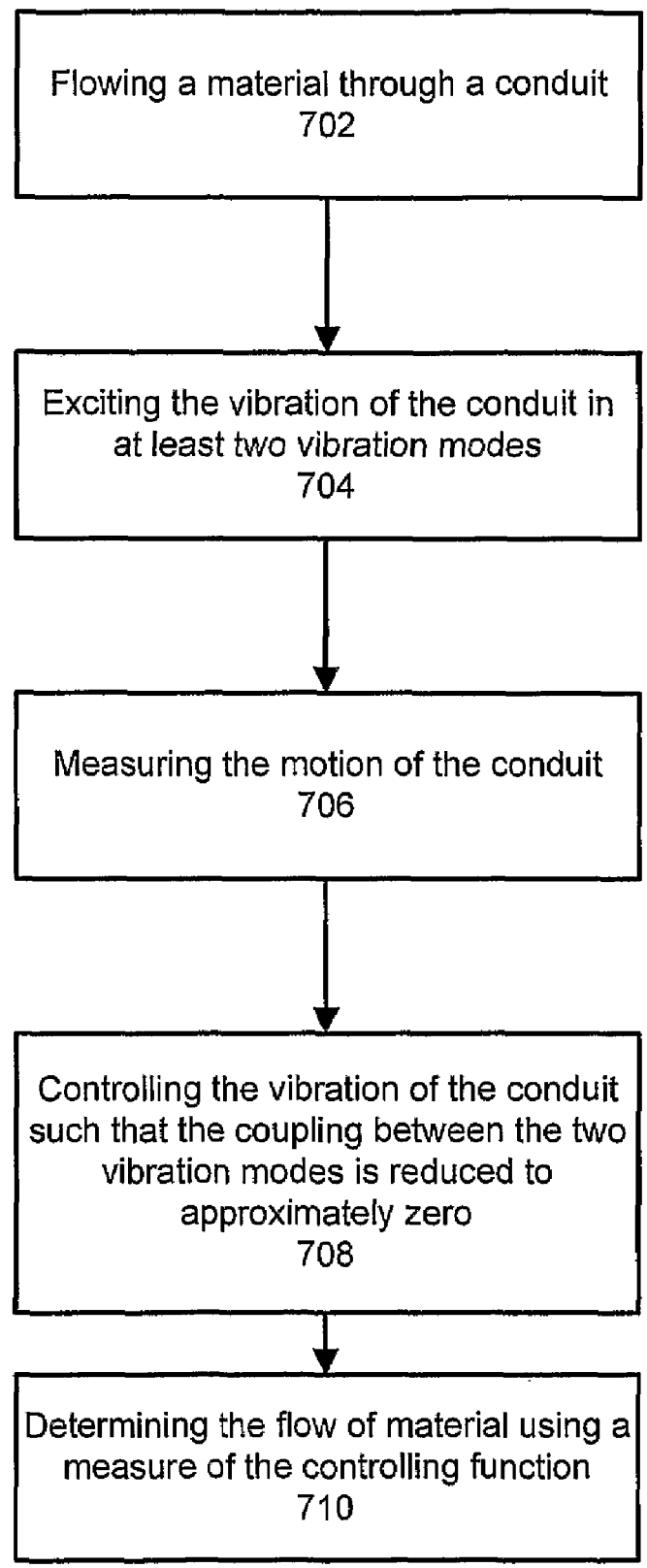
FIG. 7 is a flow chart of a method of determining the material flow through a conduit in an example embodiment of the invention.

FIG. 7 shows an algorithm that can be performed by a control system to determine the flow through a flow meter using the methods outlined above. The algorithm starts in step 702 where a material flows through a conduit of a Coriolis flow meter. In step 704, the conduit is excited in at least two vibration modes. Typically, these two vibration modes would correspond to the bend mode and the twist mode; however, other modes are contemplated. In step 706, the motion of the conduit is measured. In step 708, the vibrations applied to the conduit are controlled using the method outlined above, such that the coupling between the two vibration modes is reduced to approximately zero. Once the coupling between the two vibration modes is reduced to approximately zero, the flow of the material is determined in step 710 based on a measure of the controlling function, i.e., $\beta_b$, $\beta_t$.

The example embodiment of the invention described above may be used to determine the flow of material through a conduit independent of the non-proportional damping. In another example embodiment of the invention, the flow of material through the conduit is determined by driving only one of the dt's to zero, for example $dt_b$. Using this method, the non-proportional damping effects can be corrected by subtracting a zero-offset amount from the determined flow. For example, the main bending mode of the conduit would be excited at the natural frequency of the main bending mode. The flowing material would induce a twisting mode in the conduit. The control system would force the $dt_b$ to zero at the natural frequency of the main bending mode. The resulting motion of the conduit at the natural frequency of the bend mode is a pure bending motion. The flow of material through the conduit would be determined by the amount of force required to zero the $dt_b$. The determined flow would be corrected by subtracting a zero offset amount. The excited mode may be the main bending mode of the conduit or the main twisting mode of the conduit, or the like. Effects causing other measurement errors may be compensated for in all embodiments of the current invention, for example electromagnetic cross-talk or electronic measurement phase delay.

In the descriptions above, the invention was described using a single conduit flow meter. As well understood in the art, the current invention may be used in flow meters of other configurations, for example, duel conduit flow meters. The invention was also described using a straight conduit, but other configurations for the geometry of the flow meter are possible, for example a bent conduit.

We claim:

1. A method, comprising:
   flowing a material through a conduit (702);
   exciting the vibration of the conduit at the natural frequency of at least two vibration modes (704);
   measuring the motion of the conduit (706);
   controlling the vibration of the conduit such that the coupling between the two vibration modes is reduced to approximately zero (708);
   determining the flow of material through the conduit using a measure of the controlling function (710).

2. The method of claim 1 where a first vibration mode of the at least two vibration modes (704) comprises the main bending mode of the conduit and a second vibration mode of the at least two vibration modes (704) comprises the main twisting mode of the conduit.

3. The method of claim 1 where the controlling function is a feedback loop.

4. The method of claim 3 where the feedback loop activates a real normal mode control system.

5. The method of claim 3 where an input to the feedback loop is an estimate of the modal coordinate of one of the at least two vibration modes of the conduit derived using a modal filter.

6. A method, comprising:
   flowing a material through a conduit while exciting a first vibration mode of the conduit at a first frequency;
   exciting a second vibration mode of the conduit at a second frequency;
   measuring the relative motion of the vibrating conduit;
   exerting a first force on the conduit such that the vibration of the second mode at the first frequency is reduced to a minimum;
   exerting a second force on the conduit such that the vibration of the first mode at the second frequency is reduced to a minimum;
   determining the flow of material through the conduit based on the magnitude of the first and second forces.

7. The method of claim 6 where the first vibration mode is the main bending mode of the conduit.

8. The method of claim 7 where the first frequency is the natural frequency of the main bending mode of the conduit.

9. The method of claim 6 where the second vibration mode is the main twisting mode of the conduit.

10. The method of claim 9 where the second frequency is the natural frequency of the main twisting mode of the conduit.

11. The method of claim 6 where the first and second forces are exerted simultaneously.

12. The method of claim 6 where the first and second forces are applied by a feedback loop.

13. The method of claim 12 where the feedback loop activates a real normal mode control system.

14. The method of claim 12 where an input to the feedback loop is an estimate of the modal coordinate of the first vibration mode of the conduit derived using a modal filter.

15. A method comprising:
    flowing a material through a conduit while exciting a first vibration mode of the conduit at a first frequency;
    exciting a second vibration mode of the conduit at a second frequency;
    measuring the relative motion of the vibrating conduit at a first point and at a second point;
    determining a first phase difference between the first point and the second point measured at the first frequency;
    determining a second phase difference between the first point and the second point measured at the second frequency;
    exerting a first force on the conduit such that the first phase difference is reduced to approximately zero;
    exerting a second force on the conduit such that the second phase difference is reduced to approximately zero;
    determining the flow of material through the conduit based on the magnitude of the first and second force.

16. The method of claim 15 where first point and the second point are in a spaced apart configuration and are spaced symmetrically around an axial center of the conduit.

17. A method comprising:
    flowing a material through a conduit;
    exciting the vibration of the conduit at the natural frequency of a vibration mode of the conduit;
    measuring the motion of the conduit;
    forcing the induced vibration of the conduit, caused by the flowing material, to approximately zero at the natural frequency of the excited vibration mode of the conduit;
    determining the flow of material through the conduit using a measure of the force.

18. The method of claim 17 where the excited vibration mode of the conduit is the main bending mode and the induced vibration mode is the main twisting mode of the conduit.

19. The method of claim 17 where the excited vibration mode of the conduit is the main twisting mode and the induced vibration mode is the main bending mode of the conduit.

20. The method of claim 17 where the determined flow of material through the conduit is corrected using a zero offset amount.

21. A Coriolis flow meter, comprising:
    a conduit (502) configured to contain a material flowing through the conduit;
    at least two drivers (D1, D2) configured to excite a at least two vibration modes of the conduit;
    a sensing apparatus configured to measure the relative motion of the vibrating conduit;
    a control system configured to excite at least two vibration modes of the conduit using the at least two drivers;
    the control system configured to determine a coupling between the at least two vibration modes of the conduit;
    the control system configured to apply a force to the conduit that will reduce the coupling between the at least two vibration modes to approximately zero the control system configured to determine the flow of material through the conduit using a measure of the force.

22. The Coriolis flow meter of claim 21 where a first vibration mode of the at least two vibration modes comprises the main bending mode of the conduit and a second vibration mode of the at least two vibration modes comprises the main twisting mode of the conduit.

23. The Coriolis flow meter of claim 21 where the controlling system comprises a feedback loop.

24. The Coriolis flow meter of claim 23 further comprising:
a real normal mode control system activated by the feedback loop.

25. The Coriolis flow meter of claim 24 where an input to the feedback loop is an estimate of the modal coordinate of one of the at least two vibration modes of the conduit derived using a modal filter.

26. A Coriolis flow meter, comprising:
a conduit (502) configured to contain a material flowing through the conduit;
at least two drivers (D1, D2) configured to excite a plurality of vibration modes of the conduit;
a sensing apparatus configured to measure the relative motion of the vibrating conduit at a first point and at a second point;
a control system configured to excite a first vibration mode of the conduit at a first frequency;
the control system configured to excite a second vibration mode of the conduit at a second frequency;
the control system configured to determine a first phase difference between the first point and the second point measured at the first frequency;
the control system configured to determine a second phase difference between the first point and the second point measured at the second frequency;
the control system configured to exert a first force on the conduit such that the first phase difference is reduced to approximately zero;
the control system configured to exert a second force on the conduit such that the second phase difference is reduced to approximately zero;
the control system configured to determine the flow of material through the conduit based on the magnitude of the first and second force.

27. The Coriolis flow meter of claim 26 where first point and the second point are in a spaced apart configuration and are spaced symmetrically around a center of the conduit.

28. A Coriolis flow meter, comprising:
a conduit (502) configured to contain a material flowing through the conduit;
at least two drivers (D1, D2) configured to excite at least two vibration modes of the conduit;
a sensing apparatus configured to measure the relative motion of the vibrating conduit at a first point and at a second point;
a control system configured to excite a first vibration mode of the at least two vibration modes of the conduit at the natural frequency of the vibration mode;
the control system configured to force an induced vibration mode of the conduit, caused by the flowing material, to approximately zero at the natural frequency of the excited first vibration mode of the conduit;
the control system configured to determine the flow of material through the conduit using a measure of the force.

29. The method of claim 28 where the excited vibration mode of the conduit is the main bending mode and the induced vibration mode is the main twisting mode of the conduit.

30. The method of claim 28 where the excited vibration mode of the conduit is the main twisting mode and the induced vibration mode is the main bending mode of the conduit.

31. The method of claim 28 where the determined flow of material through the conduit is corrected using a zero offset amount.

32. A Coriolis flow meter comprising:
a conduit configure to contain a material flowing through the conduit;
a means for exciting at least two vibration modes of the conduit;
a means for sensing the relative motion of the vibrating conduit;
a means for determining a coupling between the at least two vibration modes of the conduit;
a means for applying a force to the conduit that will reduce the coupling between the at least two vibration modes to approximately zero
a means for determining the flow of material through the conduit using a measure of the force.

\* \* \* \* \*

UNITED STATES PATENT AND TRADEMARK OFFICE
CERTIFICATE OF CORRECTION

PATENT NO. : 7,441,469 B2
APPLICATION NO. : 11/574704
DATED : October 28, 2008
INVENTOR(S) : Stuart J. Shelley and Thomas Dean Sharp It is certified that error appears in the above-identified patent and that said Letters Patent is hereby corrected as shown below:

Column 6, lines 20-23, the pair of Equations (3) should appear as follows:

$$M_b \ddot{\eta}_b + D_b \dot{\eta}_b + K_b \eta_b = N_b$$
$$M_t \ddot{\eta}_t + D_t \dot{\eta}_t + K_t \eta_t = N_t \tag{3}$$

Column 6, line 35, replace "the mass flow, m, at" with --the mass flow, $\dot{m}$, at--; line 60, after "Equation (5)." insert --$\Phi_b(x)$--.

Column 7, lines 55-58, the pair of Equations (10) should appear as follows:

$$M_b \ddot{\eta}_b + D_b \dot{\eta}_b + C \dot{\eta}_t + K_b \eta_b = N_b$$
$$M_t \ddot{\eta}_t + D_t \dot{\eta}_t - C \dot{\eta}_b + K_t \eta_t = N_t \tag{10}$$

Column 7, lines 62-65, the pair of Equations (11) should appear as follows:

$$M_b \ddot{\eta}_b + D_b \dot{\eta}_b + K_b \eta_b = N_b - C \dot{\eta}_t = N_b - N_{ct}$$
$$M_t \ddot{\eta}_t + D_t \dot{\eta}_t + K_t \eta_t = N_t + C \dot{\eta}_b = N_t + N_{cb} \tag{11}$$

Column 7, line 66, replace "$N_{ct} = C \dot{\eta}_c,$" with -- $N_{ct} = C \dot{\eta}_c$, --.

Column 8, line 1, replace "$N_{cb} = C \dot{\eta}_b,$" with -- $N_{cb} = C \dot{\eta}_b$, --; lines 16-18, the pair of Equations (12) should appear as follows:

$$M_b \ddot{\eta}_b + D_b \dot{\eta}_b + K_b \eta_b = N_b$$
$$M_t \ddot{\eta}_t + D_t \dot{\eta}_t + K_t \eta_t = N_{cb} \tag{12}$$

Column 9, lines 32 and 34, replace "velocity $\dot{\eta}_b$" with --velocity $\dot{\eta}_b$ --; line 37, replace "velocity $\dot{\eta}_t$" with --velocity $\dot{\eta}_t$ --; line 47, the Equation (16) should appear as follows:

$$x_{po} = \Phi_{bpo} \dot{\eta}_b + i \Phi_{tpo} \dot{\eta}_t \tag{16}$$

UNITED STATES PATENT AND TRADEMARK OFFICE
CERTIFICATE OF CORRECTION

PATENT NO.        : 7,441,469 B2
APPLICATION NO.   : 11/574704
DATED             : October 28, 2008
INVENTOR(S)       : Stuart J. Shelley and Thomas Dean Sharp It is certified that error appears in the above-identified patent and that said Letters Patent is hereby corrected as shown below:

Column 9, line 54, the Equation (17) should appear as follows:

$$\dot{x}_{po} = \Phi_{bpo}\dot{\eta}_b + i\Phi_{tpo}\dot{\eta}_t \tag{17}$$

Column 9, lines 65 and 66, replace " $\eta_t$ " with -- $\dot{\eta}_t$ --.

Column 14, line 30, replace "bend $\eta_b$ and twist $\eta_t$ modes." with --bend $\dot{\eta}_b$ and twist $\dot{\eta}_t$ modes.--.

Signed and Sealed this

Twenty-third Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,441,469 B2
APPLICATION NO. : 11/574704
DATED : October 28, 2008
INVENTOR(S) : Stuart J. Shelley and Thomas Dean Sharp It is certified that error appears in the above-identified patent and that said Letters Patent is hereby corrected as shown below:

Column 6, lines 20-23, the pair of Equations (3) should appear as follows:

$$M_b \ddot{\eta}_b + D_b \dot{\eta}_b + K_b \eta_b = N_b$$
$$M_t \ddot{\eta}_t + D_t \dot{\eta}_t + K_t \eta_t = N_t \qquad (3)$$

Column 6, line 35, replace "the mass flow, m, at" with --the mass flow, $\dot{m}$, at--; line 60, after "Equation (5)." insert --$\Phi_b(x)$--.

Column 7, lines 55-58, the pair of Equations (10) should appear as follows:

$$M_b \ddot{\eta}_b + D_b \dot{\eta}_b + C \dot{\eta}_t + K_b \eta_b = N_b$$
$$M_t \ddot{\eta}_t + D_t \dot{\eta}_t - C \dot{\eta}_b + K_t \eta_t = N_t \qquad (10)$$

Column 7, lines 62-65, the pair of Equations (11) should appear as follows:

$$M_b \ddot{\eta}_b + D_b \dot{\eta}_b + K_b \eta_b = N_b - C \dot{\eta}_t = N_b - N_{ct}$$
$$M_t \ddot{\eta}_t + D_t \dot{\eta}_t + K_t \eta_t = N_t + C \dot{\eta}_b = N_t + N_{cb} \qquad (11)$$

Column 7, line 66, replace "$N_{ct}=C\dot{\eta}_c,$" with -- $N_{ct} = C\dot{\eta}_c$, --.

Column 8, line 1, replace "$N_{cb}=C\dot{\eta}_b,$" with -- $N_{cb} = C\dot{\eta}_b$, --; lines 16-18, the pair of Equations (12) should appear as follows:

$$M_b \ddot{\eta}_b + D_b \dot{\eta}_b + C \dot{\eta}_t + K_b \eta_b = N_b$$
$$M_t \ddot{\eta}_t + D_t \dot{\eta}_t - C \dot{\eta}_b + K_t \eta_t = N_t \qquad (12)$$

Column 9, lines 32 and 34, replace "velocity $\dot{\eta}_b$" with --velocity $\dot{\eta}_b$ --; line 37, replace "velocity $\dot{\eta}_t$" with --velocity $\dot{\eta}_t$ --; line 47, the Equation (16) should appear as follows:

$$\dot{x}_{po} = \phi_{bpo} \dot{\eta}_b + \phi_{tpo} \dot{\eta}_t \qquad (16)$$

UNITED STATES PATENT AND TRADEMARK OFFICE
CERTIFICATE OF CORRECTION

PATENT NO. : 7,441,469 B2
APPLICATION NO. : 11/574704
DATED : October 28, 2008
INVENTOR(S) : Stuart J. Shelley and Thomas Dean Sharp It is certified that error appears in the above-identified patent and that said Letters Patent is hereby corrected as shown below:

Column 9, line 54, the Equation (17) should appear as follows:

$$\dot{x}_{po} = \Phi_{bpo}\dot{\eta}_b + i\Phi_{tpo}\dot{\eta}_t \qquad (17)$$

Column 9, lines 65 and 66, replace " $\eta_t$ " with -- $\dot{\eta}_t$ --.

Column 14, line 30, replace "bend $\eta_b$ and twist $\eta_t$ modes." with --bend $\dot{\eta}_b$ and twist $\dot{\eta}_t$ modes.--.

This certificate supersedes the Certificate of Correction issued December 23, 2008.

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,441,469 B2
APPLICATION NO. : 11/574704
DATED : October 28, 2008
INVENTOR(S) : Stuart J. Shelley and Thomas Dean Sharp It is certified that error appears in the above-identified patent and that said Letters Patent is hereby corrected as shown below:

Column 6, lines 20-23, the pair of Equations (3) should appear as follows:

$$M_b\ddot{\eta}_b + D_b\dot{\eta}_b + K_b\eta_b = N_b$$
$$M_t\ddot{\eta}_t + D_t\dot{\eta}_t + K_t\eta_t = N_t \qquad (3)$$

Column 6, line 35, replace "the mass flow, m, at" with --the mass flow, $\dot{m}$, at--; line 60, after "Equation (5)." insert --$\Phi_b(x)$--.

Column 7, lines 55-58, the pair of Equations (10) should appear as follows:

$$M_b\ddot{\eta}_b + D_b\dot{\eta}_b + C\dot{\eta}_t + K_b\eta_b = N_b$$
$$M_t\ddot{\eta}_t + D_t\dot{\eta}_t - C\dot{\eta}_b + K_t\eta_t = N_t \qquad (10)$$

Column 7, lines 62-65, the pair of Equations (11) should appear as follows:

$$M_b\ddot{\eta}_b + D_b\dot{\eta}_b + K_b\eta_b = N_b - C\dot{\eta}_t = N_b - N_{ct}$$
$$M_t\ddot{\eta}_t + D_t\dot{\eta}_t + K_t\eta_t = N_t + C\dot{\eta}_b = N_t + N_{cb} \qquad (11)$$

Column 7, line 66, replace "$N_{ct}=C\dot{\eta}_c$," with -- $N_{ct} = C\dot{\eta}_c$, --.

Column 8, line 1, replace "$N_{cb}=C\dot{\eta}_b$," with -- $N_{cb} = C\dot{\eta}_b$, --; lines 16-18, the pair of Equations (12) should appear as follows:

$$M_b\ddot{\eta}_b + D_b\dot{\eta}_b + K_b\eta_b = N_b$$
$$M_t\ddot{\eta}_t + D_t\dot{\eta}_t + K_t\eta_t = N_{cb} \qquad (12)$$

Column 9, lines 32 and 34, replace "velocity $\dot{\eta}_b$" with --velocity $\dot{\eta}_b$ --; line 37, replace "velocity $\dot{\eta}_t$" with --velocity $\dot{\eta}_t$ --; line 47, the Equation (16) should appear as follows:

$$\dot{x}_{po} = \phi_{bpo}\dot{\eta}_b + \phi_{tpo}\dot{\eta}_t \qquad (16)$$

UNITED STATES PATENT AND TRADEMARK OFFICE
CERTIFICATE OF CORRECTION

PATENT NO. : 7,441,469 B2
APPLICATION NO. : 11/574704
DATED : October 28, 2008
INVENTOR(S) : Stuart J. Shelley and Thomas Dean Sharp It is certified that error appears in the above-identified patent and that said Letters Patent is hereby corrected as shown below:

Column 9, line 54, the Equation (17) should appear as follows:

$$\dot{x}_{po} = \Phi_{bpo}\dot{\eta}_b + i\Phi_{tpo}\dot{\eta}_t \tag{17}$$

Column 9, lines 65 and 66, replace " $\dot{\eta}_t$ " with -- $\dot{\eta}_t$ --.

Column 14, line 30, replace "bend $\dot{\eta}_b$ and twist $\dot{\eta}_t$ modes." with --bend $\dot{\eta}_b$ and twist $\dot{\eta}_t$ modes.--.

This certificate supersedes the Certificates of Correction issued December 23, 2008 and April 7, 2009.

Signed and Sealed this

Ninth Day of June, 2009

JOHN DOLL
*Acting Director of the United States Patent and Trademark Office*